United States Patent Office 3,652,512
Patented Mar. 28, 1972

3,652,512
POLYMERS OF 3-METHYL-1,3-PENTADIENE
James Neil Henderson, Hudson, Ohio, assignor to The Goodyear Tire & Rubber Company, Akron, Ohio
No Drawing. Continuation of application Ser. No. 836,200, June 11, 1969, which is a continuation of application Ser. No. 554,655, June 2, 1966. This application June 16, 1970, Ser. No. 48,909
Int. Cl. C08d *3/08, 1/14*
U.S. Cl. 260—79.5 B         7 Claims

ABSTRACT OF THE DISCLOSURE

A polymer of 3-methyl-1,3-pentadiene having a high cis-1,4 content prepared by subjecting 3-methyl-1,3-pentadiene to polymerization in the presence of a catalyst formed from (1) at least one metal halide selected from the group consisting of titanium tetrachloride and vanadium trichloride, and (2) at least one compound selected from the group consisting of (A) an organoaluminum compound of the formula

and (B) organo etherates of compounds having the formula:

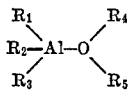

---

This application is a continuation of Ser. No. 836,200, filed June 11, 1969, now abandoned, which in turn was a continuation of Ser. No. 554,655 filed June 2, 1966, now abandoned.

This invention relates to new polymers, to a method of preparing such polymers and to products prepared therefrom.

Heretofore, polymers of 3-methyl-1,3-pentadiene have been prepared by polymerizing 3-methyl-1,3-pentadiene in the presence of free radical catalysts. These prior art polymers were low in molecular weight and comprised a mixture of polymers having cis 1,4, trans 1,4, cis 1,2, trans 1,2, and other structural configurations in the same polymeric molecule. Such polymers have not been commercially useful.

It is an object of this invention to provide a new and useful hydrocarbon polymer. It is a further object to provide a method of preparing such a polymer from 3-methyl-1,3-pentadiene and a method of curing the prepared polymer.

In accordance with this invention, it was found unexpectedly that new and useful high molecular weight partially crystalline polymers can be prepared having a structure comprising essentially a 1,4 polymer of 3-methyl-1,3-pentadiene in which a major portion of the polymer is oriented in a cis configuration.

The polymers of this invention are unique in that they can be prepared in a partially crystalline form which in their uncured state can resemble polyethylene, and which also can be cured according to methods used for curing natural and synthetic rubbers to form elastomeric materials having rubber-like properties. The polymers in their uncured state are further characterized by having from about 95 to about 100 percent of 1,4 structure oriented in the cis configuration; a glass transition temperature of from about $-15°$ C. to about $-25°$ C., and an intrinsic viscosity of from about 1 to about 10 dl./gram measured in benzene at 30° C. They are capable of being cured to form elastomeric materials having rubber-like properties.

The polymers of this invention generally have a specific gravity of from about 0.88 to about 0.94, an ultimate tensile strength of from about 2000 to about 3500 pounds per square inch, and an ultimate elongation of from about 500 to about 800 percent. The polymers prepared according to this invention can be partially crystalline, wherein up to about 50 percent of the polymer is crystalline, or they may exist in an essentially amorphous state. The polymers can be cured according to methods used for natural rubber to form vulcanizates which are useful in various applications where natural or synthetic rubber are used or they can be blended with such rubbers in certain applications, particularly in various industrial products and tires. The polymers in their uncured state are useful as plastics because of their strength.

The polymers of this invention are prepared by subjecting 3-methyl-1,3-pentadiene to polymerization in the presence of a catalyst system comprising a complex formed from (1) at least one metal halide selected from the group consisting of titanium tetrachloride and vanadium trichloride, and (2) at least one compound selected from the group consisting of (A) an organoaluminum compound of the formula:

and (B) organo etherates having the formula:

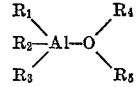

In these materials, $R_1$ is a radical selected from the group consisting of alkyl, cycloalkyl, aryl, aralkyl, alkaryl, halogen, and hydrogen; $R_2$ and $R_3$ are selected from the group consisting of alkyl, cycloalkyl, aryl, aralkyl, and alkaryl radicals; $R_4$ is an aryl radical and $R_5$ is a radical selected from the group consisting of saturated aliphatic, unsaturated aliphatic, saturated alicyclic, unsaturated alicyclic and aryl radicals.

The organoaluminum compounds which can be used to prepare the catalyst system of this invention and which also can be used to form a part of the etherates may be defined by the formula:

wherein $R_1$ is a radical selected from the group consisting of alkyl, cycloalkyl, aryl, aralkyl, and alkaryl radicals and halogen and hydrogen; $R_2$ and $R_3$ are selected from the group consisting of alkyl, cycloalkyl, aryl, aralkyl, and alkaryl radicals. Mixtures of these organoaluminum compounds can be used to prepare the catalyst system and mixtures of these organoaluminum compounds can be used to prepare the organoaluminum etherates used to prepare the catalyst system.

The radicals $R_1$, $R_2$ and $R_3$ of the organoaluminum compounds and the organo etherates can be various radicals representative of and by no means limitative of which are alkyl radicals such as methyl, ethyl, n-propyl, isopropyl, n-butyl, isobutyl, amyls, hexyls, heptyls, and the octyl radicals; cycloalkyl radicals such as cyclopentyl, cyclohexyl, cycloheptyl, and cyclooctyl radicals; aryl radicals such as phenyl and naphthyl radicals; aralkyl radicals such as benzyl, and 2-phenylethyl radicals; alkaryl radicals such as tolyl radicals; $R_1$ can also be a hydrogen radical or a halogen radical such as a fluorine, chlorine, bromine and iodine radical.

Representative of and by no means limitative of such organoaluminum compounds are: dimethylaluminum chloride, diethylaluminum chloride, di-n-propylaluminum chloride, di-n-butylaluminum chloride, diisobutylaluminum chloride, dihexylaluminum chloride, dioctylaluminum chloride, diphenylaluminum chloride, dioctylaluminum bromide, di-n-propylaluminum bromide, di-n-butylaluminum bromide, diisobutylaluminum bromide, diethylaluminum iodide, di-n-propylaluminum iodide, di-n-butylaluminum iodide, diisobutylaluminum iodide, diethylaluminum fluoride and other organoaluminum halides. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, benzylisopropylaluminum hydride and other organoaluminum hydrides. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyldi - p - tolylaluminum, ethyldibenzylaluminum, diethylphenylaluminum, diethyl-p-tolylaluminum, diethylbenzylaluminum and other triorganoaluminum compounds.

The aromatic ethers which form a part of the organoaluminum etherates used in preparing the catalyst of this invention are represented by the formula

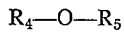

$$R_4\text{—}O\text{—}R_5$$

wherein $R_4$ is an aryl radical and $R_5$ is selected from the group consisting of saturated aliphatic, unsaturated aliphatic, saturated alicyclic, unsaturated alicyclic and aromatic radicals. The term aryl radical is intended to include both phenyl and naphthyl radicals. The aryl radicals may be substituted with halogens such as chlorine, fluorine, iodine, and bromine, as well as with alkyl and aryl radicals and other organic and inorganic radicals which are inert in that they do not adversely affect the polymerization reaction when substituted for the hydrogens of the aryl radicals. Mixtures of these ethers may also be used to prepare the organoaluminum aromatic etherates. Representative of and by no means limiting such ethers are: diphenyl ether, dinaphthyl ether, anisole, phenetole, para-methylanisole, cyclohexyl phenyl ether, cyclohexyl naphthyl ether, vinyl phenyl ether, allyl phenyl ether, anethole, estragole, alpha-naphthyl methyl ether, beta-naphthyl methyl ether, beta-naphthyl ethyl ether, biphenyl ether, veratrole, safrole, isosafrole, asarone, myristicin, apiole, p-phenylanisole and also ethers such as para-chloroanisole, para-fluoroanisole, dichlorophenyl ether and difluorophenyl ether may also be used.

The organoaluminum etherates may be prepared by procedures known to those skilled in the art. For example, organoaluminum aromatic etherates may be prepared by the reaction of an aluminum magnesium alloy with an alkyl bromide in the presence of a particular ether. Another convenient method for preparing the etherates is by mixing approximately equal molar quantities of the desired ether with the desired organoaluminum compound. When prepared in this manner the compounds are usually dissolved in an inert hydrocarbon solvent for ease of handling and accurate measurement. For convenience, the final organoaluminum aromatic etherate is usually employed as solution in an inert hydrocarbon solvent.

As indicated by the representative ethers illustrated above, the aryl ethers employed in this invention may contain more than one ethereal oxygen. When the particular aryl ether used does contain more than one ethereal oxygen atom, the amount of the organoaluminum compound and the amount of aromatic ether used should be based on the C—O—C groups contained in the particular ether rather than on the equal molar amount suggested previously. This is due to the fact that each ethereal oxygen atom will form a bond to the aluminum of an organoaluminum compound in the manner suggested by the discussion and formula previously set forth. Therefore, to form an organoaluminum etherate of an aromatic ether the amounts used are dependent directly on the ratios of the ethereal oxygen and aluminum atoms rather than the mol weights of the materials employed.

The titanium tetrachloride and vanadium trichloride which are reacted with the organoaluminum compounds and the organoaluminum aromatic etherates to form the catalysts of this invention are used in substantially an anhydrous state.

The 3-methyl-1,3-pentadiene generally exists as a mixture of isomers having cis and trans structures although essentially pure cis and trans isomers can be prepared. It is believed that in practicing this invention the trans-isomer polymerizes at a faster rate than the cis isomer.

The catalysts of this invention can be prepared by direct mixing of the organoaluminum compounds or the organoaluminum etherates with titanium tetrachloride or the vanadium trichloride. This may be done while these material are in contact with the monomer to be polymerized or by mixing in the absence of the monomer. The catalyst components may be mixed in bulk or they may be dissolved in an inert solvent and mixed as solutions. They may also be prepared by continuous catalyst make-up procedures. One of the more preferred methods of preparing the catalyst of this invention is to mix the two components of the catalyst while they are dissolved in an inert solvent in the absence of the monomer. This procedure is generally termed "preformed" or "preforming." The ratio of the organoaluminum compound or the organoaluminum aromatic etherate to titanium tetrachloride or vanadium trichloride employed in the practice of this invention is generally expressed in terms of the aluminum to titanium ratio and aluminum to vanadium ratio and may vary between a mol ratio of aluminum to titanium (Al/Ti) of about 0.5/1 to about 2.0/1 or a mol ratio of aluminum to vanadium (Al/V) of about 11/1 to about 100/1. A more preferred mol ratio of Al/Ti is from about 0.6/1 to about 1.5/1 or an Al/V ratio of from about 5/1 to about 20/1. Very effective catalysts have been prepared from organoaluminum phenyl etherates and titanium tetrachloride at mol ratios of Al/Ti of 0.8/1 to 1.2/1. It is generally preferred to use the organoaluminum aromatic etherates rather than the organoaluminum compounds because faster polymerization reaction rates usually result from the use of the organoaluminum aromatic etherates. The temperature employed in the preparation of these catalysts is not cirtical and may vary widely. The range of from about —40° C. to 60° C. is conveniently used. The use of an inert solvent as a carrier for the catalyst components assists in obtaining good mixing, accurate measurement and proper temperature control.

The amount of catalyst employed to polymerize the 3-methyl-1,3-pentadiene according to the practice of this invention depends upon a number of factors such as the rate of polymerization desired, temperature employed and other conditions all of which can be varied over a wide range. Thus, from about 0.01 to about 5 parts by weight calculated as titanium tetrachloride or vanadium trichlroide per 100 parts by weight of the monomer to be polymerized can be used to catalyze the polymerization reaction. A more desirable range of from about 0.05 to about 1.0 parts by weight of titanium tetrachloride or vanadium trichloride per 100 parts by weight of the monomer to be polymerized is usually employed.

The polymerizations of this invention may be conducted in bulk although they are generally carried out in an inert solvent or diluent which does not adversely affect the polymerization. As is understood by those skilled in the art, it is generally desired to conduct the polymerizations in the absence of materials which adversely affect the polymerizations, particularly materials which inhibit the activity of the catalyst. Various solvents and diluents can be used representative of but certainly not limitative of which are liquid aromatic hydrocarbons such as benzene and toluene; hydrogenated aromatic hydrocarbons such as tetralin; liquid aliphatic hydrocarbons such as pentane, heptane, hexane, petroleum ether, decane; and cycloaliphatic hydrocarbons such as cyclohexane, decalin and cyclooctane. Mixtures of such solvents may be used, if desired.

The following illustrative examples are set forth to further exemplify the objects and advantages of the invention. The parts and percentages are by weight unless otherwise indciated.

EXAMPLE 1

A dry reactor was charged under a dry n-pentane atmosphere with 40 parts of n-pentane as a solvent and 10.6 parts of the monomer 3-methyl-1,3-pentadiene. The n-pentane and monomer had been dried by treatment with silica gel. The monomer comprised 99.7 percent by weight of 3-methyl-1-trans-3-pentadiene and 0.3 percent by weight of 3-methyl-1-cis-3-pentadiene. The reactor was then charged with catalyst. The catalyst was prepared by adding under dry nitrogen atmosphere 0.025 parts of titanium tetrachloride to a mixture comprising 0.28 parts of dry n-hexane, 0.0235 parts of triisobutylaluminum and .020 parts of diphenyl ether. The polymerization reaction was allowed to proceed at approximately 25° C. for one hour. To the reaction mixture was added 10.3 parts of a solution comprising 1.5 parts of mixed para-phenylene diamines and 8.8 parts of benzene to stop the reaction. To this mixture was then added 120 parts of methanol to coagulate the polymer. A yield of 4.4 parts of coagulated polymer was obtained when dried to a tough spongy crystalline material. Analysis of the polymer indicated it comprised at least 97 percent of cis 1,4- structure. The Gehman inflection temperature was −8° C. from which the glass transition temperature was estimated to be approximately −20° C. The polymer melted at about 79 to 84° C. measured on the hot stage of a polarizing microscope.

EXAMPLE 2

A dry reactor was charged under a dry n-pentane atmosphere with 40 parts of n-pentane as a solvent and 10.5 parts of monomer. The n-pentane and monomer had been dried by treatment with silica gel. The monomer comprised 64 percent by weight of 3-methyl-1-trans-3-pentadiene, 32 percent by weight of 3-methyl-1-cis-3-pentadiene and about 4 percent by weight of inert monoolefins containing 6 carbon atoms. The reaction mixture was then charged with catalyst. The catalyst was prepared by adding under dry nitrogen atmosphere .0285 parts of titanium tetrachloride to a mixture comprising 0.32 parts of dry n-hexane, .027 parts of triisobutylaluminum and 0.23 parts of diphenyl ether. The polymerization was allowed to proceed at approximately 25° C. for one day. After coagulation in approximately 100 parts of methanol and drying at reduced pressure, a yield of 4 parts of coagulated polymer was obtained. Analysis of the polymer by nuclear magnetic resonance and infrared techniques indicated that it had a structure essentially identical to the polymer of Example 1.

EXAMPLE 3

A dry reactor was charged with 150 parts of n-pentane and 25.8 parts of a 3-methyl-1,3-pentadiene mixture. The 3-methyl-1,3-pentadiene mixture comprised 16.0 parts of 3-methyl-1-trans-3-pentadiene and 9.8 parts of 3-methyl-1-cis-3 pentadiene. The reactor was then charged with catalyst. The catalyst was prepared by adding under dry nitrogen atmosphere 0.15 parts of titanium tetrachloride to a mixture comprising 0.13 parts of triisobutyl aluminum 0.115 parts of diphenyl ether in 2.0 parts n-hexane. The reaction was allowed to proceed at approximately 25° C. for 30 hours. At this time the reaction was stopped by the addition of 0.20 parts of an aromatic amine and 0.20 parts of tetraethylene pentamine to the reactor. The polymer was then coagulated by the addition of from about 200 to about 300 parts of methanol to yield 12.4 parts of dry polymer having an inherent viscosity, measured in benzene at 30° C., of 5.3 dl./g.

To a portion of the dry polymer was applied a pressure of from about 1000 to about 2000 pounds per square inch at 127° C. for 10 minutes to form a sheet of the polymer having a 1/16 inch thickness. This sheet resembled a soft rubber after its preparation but upon being exposed to a 40° C. temperature for 24 hours, became a stiff thermoplastic material. A portion of this sheet was tested according to ASTM method DO 412–61T using a cross-head separation of 5 inches per minute. By this test the stress at the yield point, which was at about 30 percent elongation, was 635 pounds per square inch based on its initial cross section. Also this test indicated the stress to be 630 pounds per square inch, at 300 percent elongation. Its ultimate tensile strength was 2,430 pounds per square inch, at an elongation of 700 percent.

Another portion of the dry polymer was mixed on a rubber mill with vulcanizing ingredients. The mixture comprised 100 parts of the dry polymer, 6 parts of zinc oxide, 4 parts of stearic acid, 0.5 parts of mercaptobenzothiazole, 3.5 parts of sulfur and 0.5 parts of tetraethylene pentamine. Sheets were prepared from the mixture and cured at a 1/16 of an inch thickness. Specimens were cut from the cured sheet and tested according to ASTM method number DO 412–61T using a cross-head separation of 5 inches per minute. Results of the test are indicated in Table I.

TABLE I

Instron tensile properties of vulcanizates of polymers of 3-methyl-1,3-pentadiene

| Cure (min./° F.) | 300 percent modulus (p.s.i.) | Ultimate tensile strength (p.s.i.) | Percent elongation at break |
| --- | --- | --- | --- |
| 20/260 | 99 | 1,520 | 1,000 |
| 40/260 | 145 | 2,955 | 825 |
| 80/260 | 220 | 4,205 | 815 |
| 120/260 | 210 | 3,740 | 800 |

The cured sample were rubber-like when freshly prepared but the lower cures i.e., 20 minutes at 260° F., and 40 minutes at 260° F. became rigid upon standing at about 23° C., whereas the other cures remained rubber-like. Therefore, before determining the tensile strengths of the cured samples, all of the cured samples were melted in order to soften the lower cures and so that all of the cured samples would be analyzed in an amorphous condition.

Another portion of the dry polymer was pressed at a pressure of from about 1000 to about 2000 pounds per square inch pressure at 127° C. to form a sheet having 1/32 of an inch thickness. An X-ray diffraction analysis of a portion of the sheet indicated that about 40 percent of the polymer was crystalline.

EXAMPLE 4

To a dry reactor under a dry n-pentane atmosphere was charged 35 parts of n-pentane as a solvent and 10.5 parts of monomer. The monomer comprised 69.4 percent by weight of 3-methyl-1-trans-3-pentadiene and, 28.3 percent of 3-methyl-1-cis-3-pentadiene, and 2.3 percent by weight of inert olefins having 6 carbon atoms. The reactor was then charged with catalyst. The catalyst was prepared by adding under a dry nitrogen atmosphere 0.0624 parts of titanium tetrachloride to a mixture comprising 0.0652 parts of triisobutyl aluminum and 0.67 parts of n-heptane. The polymerization reaction mixture was agitated at 50° C. for 24 hours. The polymerization reaction was then stopped by adding to the reactor a mixture of methanol and benzene. After one hour the brown color of the very viscous polymerization mixture had changed to a faintly greenish color. The polymer was coagulated by adding approximately 120 parts of methanol. After drying the coagulated polymer under a reduced pressure, 6.55 parts of a somewhat leathery rubber-like material was obtained which slowly hardened due to crystallization. An infrared analysis of the polymer indicated that the structure was essentially identical with the polymer prepared in Example 1.

EXAMPLE 5

A dry reactor was charged under a nitrogen atmosphere with 57 parts of benzene as solvent and 11.0 parts of monomer. The monomer comprised 67.1 weight percent of 3-methyl-1-trans-3-pentadiene, 32.7 weight percent 3-methyl-1-cis-3-pentadiene and 0.2 percent by weight of monoolefins having 6 carbon atoms. The reactor was then charged with 0.50 parts triisobutylaluminum in 0.70 parts benzene, and 0.082 parts of vanadium trichloride in 0.21 parts benzene. The reactor was agitated and the polymerization reaction allowed to proceed at 50° C. for about 24 hours. The polymerization reaction was stopped by adding to the reactor a benzene solution of an aromatic amine antioxidant following which the resulting polymer was coagulated in methanol. The coagulated polymer was dried to yield 0.93 parts of product. An infrared analysis made of the product indicated that its structure was essentially identical with that of the polymer prepared in Example 1. Also, an X-ray diffraction pattern of the product was essentially the same as the X-ray diffraction pattern of the product prepared in Example 1.

EXAMPLE 6

A dry reactor was charged under a nitrogen atmosphere with 57 parts of benzene as a solvent and 11 parts of monomer. The monomer comprised 64.3 weight percent of 3-methyl-1-trans-3-pentadiene, 35.4 weight percent of 3-methyl-1-cis-3-pentadiene, and 0.3 percent by weight of monoolefins having six carbon atoms. The reactor was then charged with 0.40 parts of diphenyl ether, 0.46 parts of triisobutyl aluminum in 1.29 parts of benzene, and with 0.063 parts of milled vanadium trichloride in 1 part n-heptane. The reactor was agitated and the polymerization reaction was allowed to proceed at 50° C. for three days. The polymerization reaction was stopped by adding to the reactor about 8.8 parts of a benzene solution containing 0.3 parts methanol and 0.1 part phenolic antioxidant, following which addition the polymer was coagulated in methanol. The amount of the coagulated polymer after drying was 0.7 parts by weight. An infrared analysis made of the polymer indicated that its structure was essentially identical with that of the polymer prepared in Example 1.

While certain representative embodiments and details have been shown for the purpose of illustrating this invention it will be apparent to those skilled in the art that various changes and modifications may be made therein without departing from the spirit or scope of the invention.

What is claimed is:

1. A polymer of 3-methyl-1,3-pentadiene, up to about 50% crystalline in its uncured state and capable of being sulfur-cured to form an elastic material having rubber-like properties, having from about 95 to about 100 percent of a 1,4 structure oriented in a cis configuration, a glass transition temperature of from about −15° C. to about −25° C., an intrinsic viscosity of from about 1 to about 10 dl./gram measured in benzene at 30° C. and a specific gravity of from about 0.88 to about 0.94.

2. A polymer according to claim 1 wherein the polymer is sulfur-cured to form an elastomeric material having rubber-like properties.

3. A polymer according to claim 1 wherein the polymer has a melting point of from about 79° C. to about 84° C., at least about 97% of a cis-1,4 structure and a Gehman inflection temperature of about −8° C.

4. A polymer according to claim 3 wherein the crystalline polymer is sulfur-cured to form an elastomeric material having rubber-like properties.

5. A method of polymerizing trans-3-methyl-1,3-pentadiene to form a polymer up to about 50% crystalline and capable of being sulfur-cured to form an elastomeric material having rubber-like properties, having from about 95 to about 100 percent of a 1,4-structure oriented in a cis configuration, a glass transition temperature of from about −15° C. to about −25° C., an intrinsic viscosity of from about 1 to about 10 dl./gram measured in benzene at 30° C. and a specific gravity of from about 0.88 to about 0.94, comprising subjecting trans-3-methyl-1,3-pentadiene to polymerization in the presence of a catalyst system formed from the group consisting of (1) at least one metal halide selected from the group consisting of titanium tetrachloride and vanadium trichloride, and (2) at least one compound selected from the group consisting of (A) an organoaluminum compound of the formula:

and (B) organo etherates of compounds having the formula:

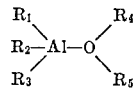

wherein $R_1$ is a radical selected from the group consisting of alkyl, cycloalkyl, aryl, aralkyl, and alkaryl radicals, and halogens and hydrogen; $R_2$ and $R_3$ are selected from the group consisting of alkyl, cycloalkyl, aryl, aralkyl, and alkaryl radicals; $R_4$ is an aryl radical and $R_5$ is a radical selected from the group consisting of saturated alicyclic, unsaturated alicyclic and aryl radicals, and where the mol ratio of aluminum to titanium is from about 0.5/1 to about 2.0/1 or the mol ratio of aluminum to vanadium is from about 11/1 to about 100/1.

6. A method according to claim 5 wherein the catalyst is formed from titanium tetrachloride and triisobutylaluminum and diphenyl ether where the mol ratio of aluminum to titanium is from about 0.6/1 to about 1.5/1.

7. A method according to claim 5 wherein the catalyst is formed from titanium tetrachloride and triisobutylaluminum.

References Cited

UNITED STATES PATENTS 3,476,731  11/1969  Cuzin et al. _____ 260—94.2
3,550,158  12/1970  Uaha et al. _____ 260—94.3

JAMES A. SEIDLECK, Primary Examiner

R. A. GAITHER, Assistant Examiner

U.S. Cl. X.R.

260—94.3